US007681189B2

(12) United States Patent
Mantani

(10) Patent No.: US 7,681,189 B2
(45) Date of Patent: Mar. 16, 2010

(54) INFORMATION PROCESSING DEVICE CAPABLE OF UPDATING A STORED PROGRAM

(75) Inventor: Nobunori Mantani, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1204 days.

(21) Appl. No.: 11/237,209

(22) Filed: Sep. 28, 2005

(65) Prior Publication Data

US 2006/0101455 A1 May 11, 2006

(30) Foreign Application Priority Data

Oct. 1, 2004 (JP) ............................. 2004-290282

(51) Int. Cl.
*G06F 9/44* (2006.01)
(52) U.S. Cl. ...................................... 717/168
(58) Field of Classification Search .................. 717/168
See application file for complete search history.

(56) References Cited

U.S. PATENT DOCUMENTS

| 6,163,801 | A  | * | 12/2000 | O'Donnell et al. | ........... | 709/213 |
| 6,532,588 | B1 | * | 3/2003  | Porter           | ........... | 717/170 |
| 6,968,550 | B2 | * | 11/2005 | Branson et al.   | ........... | 717/168 |
| 7,093,244 | B2 | * | 8/2006  | Lajoie et al.    | ........... | 717/168 |
| 7,111,292 | B2 | * | 9/2006  | Bonnett et al.   | ........... | 717/171 |
| 7,117,492 | B2 | * | 10/2006 | Ikeda et al.     | ........... | 717/170 |
| 7,167,943 | B2 | * | 1/2007  | Tashiro          | ........... | 711/103 |
| 2003/0033598 | A1 | * | 2/2003 | Ito             | ........... | 717/170 |
| 2004/0168167 | A1 | * | 8/2004 | Ono             | ........... | 717/170 |
| 2004/0186952 | A1 | * | 9/2004 | Hagiwara et al. | ........... | 711/112 |
| 2005/0278360 | A1 | * | 12/2005 | Boyd et al.    | ........... | 707/100 |

FOREIGN PATENT DOCUMENTS

| JP | 2000-207180 | 7/2000 |
| JP | 2001-256057 | 9/2001 |

OTHER PUBLICATIONS

Heistand, "An Executive System Implemented as a Finite-State Automaton", Nov. 1964, ACM, vol. 7/No. 11, pp. 669-677.*
Bhoedjang et al. "Evaluating Design Alternatives for Reliable Communication on High-Speed Networks", Nov. 2000, ACM, vol. 35, Issue 11, pp. 71-81.*
Patent Abstracts of Japan, Publication No. 2000-207180, Publication Date: Jul. 28, 2000, 1 page.
Patent Abstracts of Japan, Publication No. 2001-256057, Publication Date: Sep. 21, 2001, 1 page.

* cited by examiner

*Primary Examiner*—Anna Deng
(74) *Attorney, Agent, or Firm*—Osha • Liang LLP

(57) ABSTRACT

A controller compares hardware structure information stored in a nonvolatile memory and hardware structure information of an updated program obtained from an interface unit, and transfers the updated program to the nonvolatile memory to change a current program when a result of the comparison exhibits matching. When a controller determines that a user must determine execution/nonexecution of rewrite processing, the controller instructs the display unit to perform display, and performs the rewrite processing according to a user's instruction received from an input unit. The program can be updated appropriately corresponding to various conditions such as improvement in performance of the device, changes in operation environment and others determined by a user. Accordingly, it is possible to provide an information processing device, which can update a control program even in the case where the device has a different structure, when the user determines that such updating is allowed.

4 Claims, 3 Drawing Sheets

FIG.2

| UNCHANGEABLE CONDITION | CHANGEABLE CONDITION |
|---|---|
| SIZE OF FLASH MEMORY | PROGRESSIVE REPRODUCTION FUNCTION |
| SIZE OF RAM | RECORDING SYSTEM |
| BUS WIDTH OF RAM | (NTSC/PAL) |
| KIND OF LSI | ... |
| ... | |

INFORMATION PROCESSING DEVICE CAPABLE OF UPDATING A STORED PROGRAM

BACKGROUND OF THE INVENTION

1. Field of the Invention

The present invention relates to an information processing device capable of updating a stored program.

2. Description of the Background Art

In recent years, many electric devices operate according to control programs stored in the devices. The control programs are updated for the purposes of overcoming disadvantages in operation of the devices, adding new functions to the devices and others.

In many cases, a new control program (which will be referred to as an "updated program" hereinafter) is provided together with a determination program for determining whether a control program, which is currently stored in the device (and will be referred to as a "current program" hereinafter), is to be updated or not. A program provider provides the determination program on the assumption that a user not having sufficient information about the device may update the control program.

As examples of the device and method for updating the control program, Japanese Patent Laying-Open No. 2000-207180 has disclosed an information processing device and a program rewriting method, in which a determination routine for determining whether a program in the device is to be rewritten or not is stored in a memory card together with a program for rewriting, and the device executes the routine on the memory card to determine whether the update is necessary or not so that the determination of whether the program is to be updated or not is performed individually according to each of various environmental changes after shipment of products.

Japanese Patent Laying-Open No. 2001-256057 has disclosed an update method for a control program of a service device, which is formed of various kinds of hardware, as well as the service device. The service device performs update processing by identifying an update program suitable for the device itself, and thereby can correctly update the program even when such a change is made in structure that cannot be dealt with by the update program incorporated into the device.

For preventing occurrence of a problem that the device becomes inoperable due to rewriting of the control program, many conventional determination programs are configured to determine that the control program cannot be updated when an execution condition set in the updated program does not match with an execution condition set in the current program. The execution condition is information, e.g., related to a structure of a device executing the control program.

However, even when the execution condition of the updated program does not strictly match with that of the updated program, devices having certain structures can execute the updated program in some cases. Even in such cases, when the update processing is attempted according to the determination program, the determination program determines that the control program cannot be updated. Therefore, the control program is not updated.

Specific examples will now be described. For example, it is assumed that there is a disc reproducing device of reproducing video audio information recorded on a disc such as a CD-ROM (Compact Disc Read Only Memory) or a DVD (Digital Versatile Disc), and a control program is stored in a flash memory included in the device. The disc reproducing device can reproduce only the video audio information recorded only in the NTSC (National Television System Committee) system.

When this disc reproducing device reproduces the video audio information recorded in the PAL (Phase Alternation by Line) system, the video audio information is reproduced according to the NTSC system. The vertical frequency in the NTSC system is generally 60 Hz, and the vertical frequency in the PAL system is generally 50 Hz. Therefore, when it is attempted to reproduce the information recorded in the PAL system, disadvantages such as a disturbance in picture occur due to a difference in vertical frequency.

It is assumed that a device manufacturer has prepared ten thousand flash memories, which have stored programs for reproducing video audio information, e.g., in the NTSC system, for manufacturing disc reproducing devices. It is also assumed that five thousand flash memories among the ten thousand memories are mounted on the products without changing the programs. The other five thousand flash memories are mounted on disc reproducing device reproducing the video audio information in the PAL system.

In many cases, a circuit (decoder circuit) reproducing the video audio information recorded on the disc is operable in both the NTSC and PAL systems. Therefore, it is assumed that the device manufacturer has considered that it is not necessary to prepare newly the flash memories storing the program reproducing the video audio information in the PAL system, and it is merely required to rewrite the control program stored in the five thousand flash memories.

However, the execution condition (the record system of the video information to be reproduced) of the updated program is set to the PAL system although the execution condition of the current program is set to the NTSC system. According to the conventional method, therefore, the determination program determines that the program cannot be updated, because there is a difference in execution condition between the programs. The device manufacturer must execute another method for updating the control program. For newly updating the programs in a factory of the device manufacturer, a large number of devices must be processed so that operators must perform time-consuming works.

For reducing the required labor and time, such a method may be envisaged that the current program is forcedly rewritten and replaced with the updated program without executing the determination program. However, when a failure is found in an operation of the devices after the update of the program, or when the devices do not operate after the update of the program, the device manufacturer must identify the cause at much expense in time and effort.

SUMMARY OF THE INVENTION

The invention overcomes the above disadvantages, and it is an object of the invention to provide an information processing device which can update a control program when a user determines that the control program can be updated, even in the case where a device has a different structure.

In summary, the invention provides an information processing device including a rewritable storing unit, a receiving unit and a rewriting unit. The storing unit nonvolatilely stores a control program for controlling an operation of the information processing device, and first information representing an execution condition of the control program and including a first unchangeable condition not allowing change of an execution environment corresponding to the control program and a first changeable condition allowing change of the execution environment. From a record medium storing an updated program and second information exhibiting an execution condition of the updated program and including a second unchangeable condition not allowing change of an execution environment corresponding to the updated program and a second changeable condition allowing change of the execution environment, the receiving unit reads the updated program and the second information. The rewriting unit compares the first information with the second information, performs rewrite processing of replacing the control program with the updated program when a result of the comparison exhibits matching, and determines whether the rewrite processing is to be performed or not, according to a rewrite instruction received from a user when the result of the comparison exhibits mismatching. The rewriting unit includes a controller determining according to the result of the comparison whether input of the rewrite instruction is required for performing the rewrite processing or not, and providing a request signal for receiving the rewrite instruction when it is determined that the input of the rewrite instruction is necessary, a display unit displaying and informing the user that the rewrite processing requires the input of the rewrite instruction, in response to the request signal, and an input unit for inputting the rewrite instruction to be applied to the controller. The controller provides the request signal when the result of the comparison exhibits that the first and second unchangeable conditions match with each other, and the first and second changeable conditions do not match with each other.

According to another aspect of the invention, an information processing device includes a rewritable storing unit, a receiving unit and a rewriting unit. The storing unit nonvolatilely stores a control program for controlling an operation of the information processing device, and first information representing an execution condition of the control program. The receiving unit receives an updated program and second information exhibiting an execution condition of the updated program. The rewriting unit compares the first information with the second information, performs rewrite processing of replacing the control program with the updated program when a result of the comparison exhibits matching, and determines whether the rewrite processing is to be performed or not, according to a rewrite instruction received from a user when the result of the comparison exhibits mismatching.

Preferably, the rewriting unit includes a controller determining according to the result of the comparison whether input of the rewrite instruction is required for performing the rewrite processing or not, and providing a request signal for receiving the rewrite instruction when it is determined that the input of the rewrite instruction is necessary, a display unit displaying and informing the user that the rewrite processing requires the input of the rewrite instruction, in response to the request signal, and an input unit for inputting the rewrite instruction to be applied to the controller.

More preferably, the first information includes a first unchangeable condition not allowing change of an execution environment corresponding to the control program and a first changeable condition allowing change of the execution environment corresponding. The second information includes a second unchangeable condition not allowing change of an execution environment corresponding to the updated program and a second changeable condition allowing change of the execution environment. The controller provides the request signal when the result of the comparison exhibits that the first and second unchangeable conditions match with each other, and the first and second changeable conditions do not match with each other.

Further preferably, from a record medium storing the updated program and the second information, the receiving unit reads the updated program and the second information.

Accordingly, the invention can offer the following major advantages. Before replacing the current program stored in the device with the updated program, the hardware structure information, i.e., the execution condition of the current program is compared with that of the updated program, and the program can be updated according to the user's instruction even when the result of comparison exhibit mismatching. Therefore, the program can be updated depending on the execution environment.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 illustrates an execution condition of a control program.

DESCRIPTION OF THE PREFERRED EMBODIMENTS

Embodiments of the invention will now be described with reference to the drawings. In the following description, the same or corresponding portions bear the same reference numbers.

Figure 1:
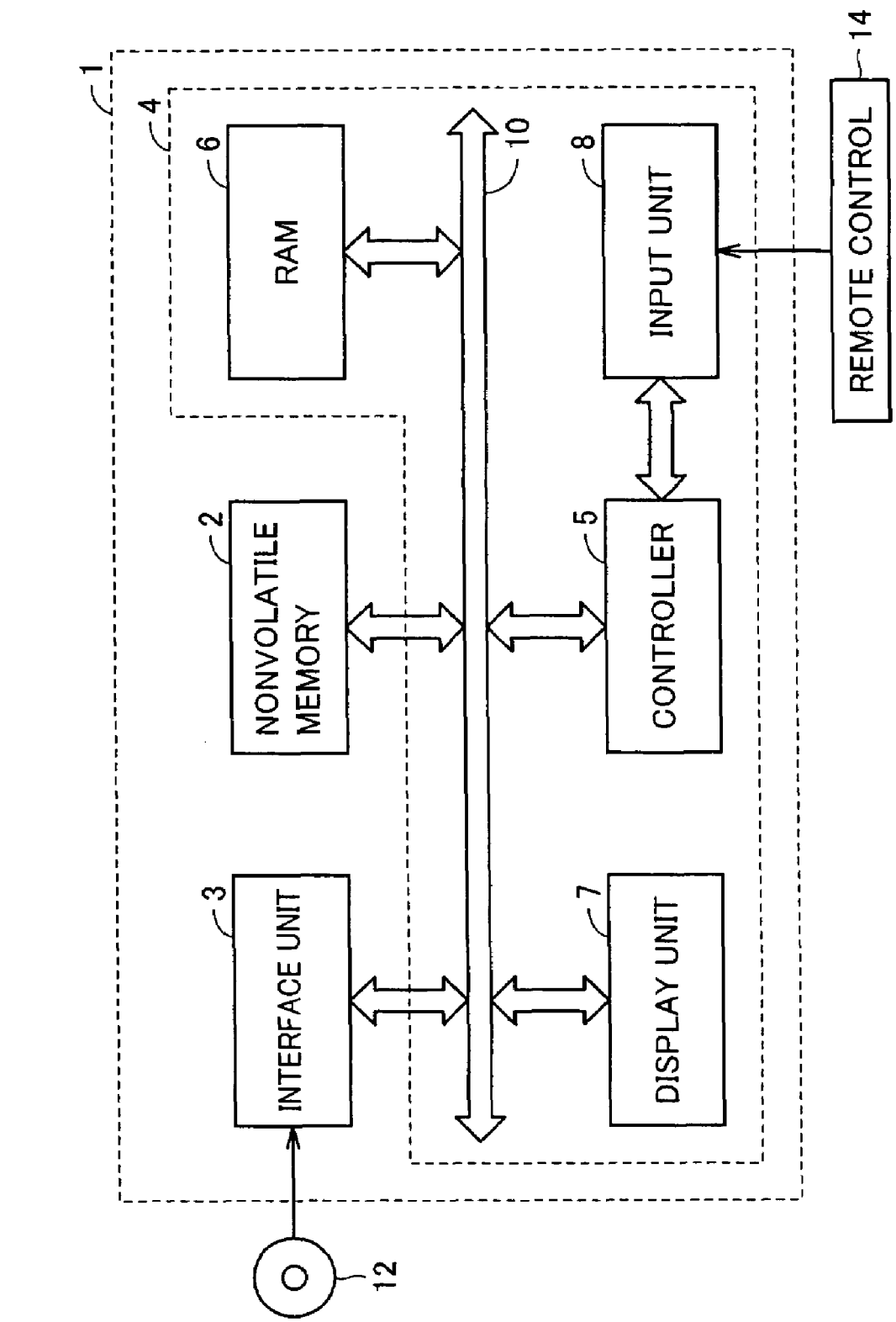
FIG. 1 is a block diagram of a disc reproducing device provided with an information processing device according to the invention.

FIG. 1 is a block diagram showing a basic structure of an information processing device of the invention.

Referring to FIG. 1, an information processing device 1 includes a nonvolatile memory 2 storing a control program controlling the device and hardware structure information (which may also be referred to as "H/W structure information" hereinafter) relating to the structure of information processing device 1, an interface unit 3 receiving an updated program and the H/W structure information for executing the updated program, and a rewriting unit 4 making a comparison of each H/W structure information, and performing rewrite processing for replacing the control program (current program) stored in nonvolatile memory 2 with the updated program according to a result of the comparison. The H/W structure information corresponds to an execution condition of the program. A specific example of the H/W structure information and details of the processing of rewriting unit 4 will be described later.

Rewriting unit 4 includes a controller 5 which determines according to the result of comparison whether the user must provide the rewrite instruction for performing the rewrite processing or not, and provides a request signal for receiving a rewrite instruction when it is determined that the input of the rewrite instruction is required, a RAM (Random Access Memory) 6 temporarily storing data required for the processing by controller 5 and the updated program, a display unit 7 which displays and informs the user that provision of the rewrite instruction is required, in response to the request signal, and an input unit 8 providing the rewrite instruction entered by the user to the controller. The respective blocks in information processing device 1 are connected by an internal bus 10.

The "user" in the description of the invention means a "person operating information processing device 1", and the user may be an engineer of the device manufacturer, a consumer or the like.

Information processing device 1 is, e.g., a disc reproducing device that can reproduce an optical disc such as a CD-R (Compact Disc-Recordable), CD-ROM or DVD. In the following description, it is assumed that information processing device 1 is a disc reproducing device.

Nonvolatile memory 2 is, for example, a flash memory, an EEPROM (Electrically Erasable and Programmable Read Only Memory) or a hard disc. In the following description, it is assumed that nonvolatile memory 2 is a flash memory.

When a disc 12 bearing the updated program and the H/W structure information is inserted into interface unit 3, interface unit 3 reads the updated program and the H/W structure information from disc 12, and transfers the updated program to RAM 6. Disk 12 is, for example, a disc such as a CD-R already described.

In the case where information processing device 1 is the disc reproducing device, interface unit 3 functions as a reading unit reading the information from the disc. The medium bearing the updated program and others is not restricted to the optical disc, and may be a magnetic disc such as a flexible disc, a memory card or the like. The updated program may be provided by downloading it from a server over a network. The interface unit 3 obtains the updated program and others in a manner depending on the manner of provision.

Controller 5 executes the control program stored in nonvolatile memory 2 in addition to the foregoing rewrite processing. Controller 5 is a CPU (Central Processing Unit), but may be formed of a plurality of LSIs. The program of the rewrite processing is stored in a ROM (not shown) inside the CPU or nonvolatile memory 2.

In the structure shown in FIG. 1, input unit 8 receives the user's instruction from a remote control 14. However, input unit 8 may be configured, e.g., to receive the instruction from the user depressing operation buttons arranged on a console panel of the disc reproducing device.

The processing of the information processing device of the invention can be summarized as follows: The controller 5 compares the hardware structure information stored in nonvolatile memory 2 with the hardware structure information of the updated program obtained from interface unit 3. When a result of this comparison exhibits matching, controller 5 transfers the updated program to nonvolatile memory 2, and replaces the current program with it. When controller 5 determines that the user must decide the necessity or nonnecessity of the rewrite processing, controller 5 instructs display unit 7 to perform the display, and the rewrite processing is performed according to the user's instruction received from input unit 8. Depending on various conditions, which are determined by the user, such as high-performance configuration of the device and/or change in operation environment, the program is appropriately updated.

FIG. 2 illustrates the execution condition of the control program.

FIG. 2 illustrates an example of the H/W structure information corresponding to the unchangeable condition and changeable condition. The "unchangeable condition" and "changeable condition" relate to the execution environment corresponding to the current program and updated program. The "unchangeable condition" is the condition not allowing the change in execution environment, and is the condition which does not allow correct execution of the program when the condition is changed (i.e., when the program is executed in a device having a different hardware structure). The "changeable condition" is a condition which allows execution of the program even when the condition changes.

For example, the unchangeable condition includes a size (capacity) of the flash memory (nonvolatile memory 2 in FIG. 1), a size of a RAM, a bus width of the RAM, a type of an LSI and/or the like. For the following reason, the unchangeable condition includes the size of the flash memory. When the size of the updated program is larger than the size of the flash memory, the write processing of controller 5 can store only a part of the updated program in the flash memory. Therefore, the information processing device cannot correctly operate when it is restarted. As described above, the size of the flash memory corresponds to the unchangeable condition.

An example of the changeable condition is a progressive reproduction function (i.e., function of reproducing pictures of high picture quality). For example, it is assumed that the current program cannot achieve the progressive reproduction function, but the updated program can achieve it. Also, it is assumed that controller 5 in FIG. 1 is hardware that can achieve the progressive reproduction function. In this case, the execution condition of the updated program does not match with that of the updated program, but the updated program can achieve the progressive reproduction function. Therefore, the progressive reproduction function corresponds to the changeable condition.

Likewise, such a function is changeable, that is, a function of reproducing the video audio information recorded in the NTSC system can be changed to a function of the reproducing information recorded in the PAL system by updating the control program.

These conditions, i.e., the H/W structure information may be described in a processing routine of each of the current program and the updated program, and may also be included in external data if the program refers to the external data.

Figure 3:
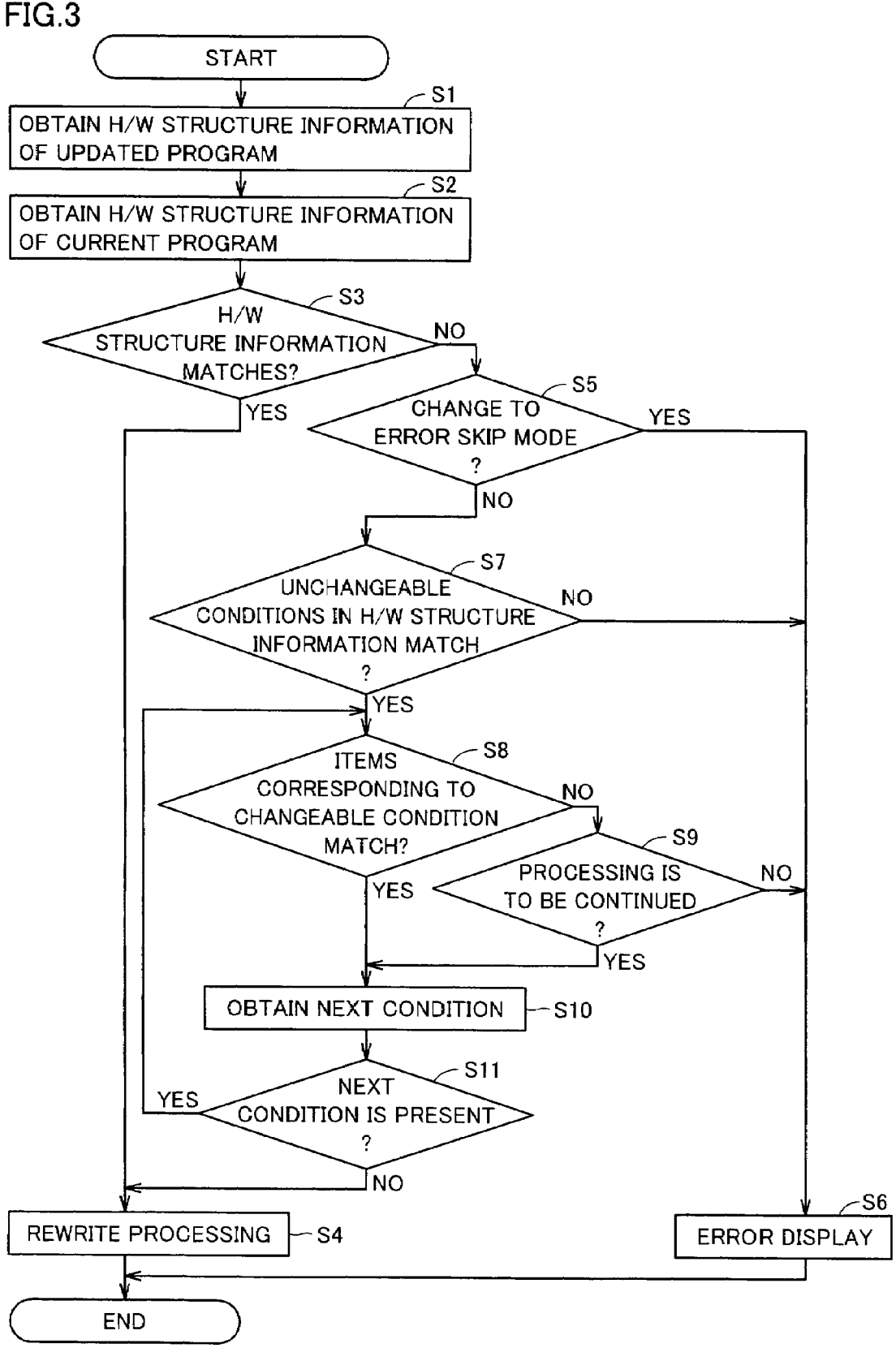
FIG. 3 is a flowchart illustrating a detail of processing of information processing device 1 in FIG. 1.

FIG. 3 is a flowchart illustrating a detail of the processing of information processing device 1 in FIG. 1.

Referring to FIG. 3, when the processing starts, controller 5 in FIG. 1 obtains the H/W structure information of the updated program from RAM 6 in step S1. In next step S2, controller 5 obtains the H/W structure information of the current program from nonvolatile memory 2.

In subsequent step S3, controller 5 compares these two kinds of H/W structure information with each other to determine whether these match with each other or not. When controller 5 confirms the matching between them, it performs the rewrite processing in step S4 to replace the current program stored in nonvolatile memory 2 with the updated program.

When controller 5 confirms the mismatching of the H/W structure information in step S3, it provides a warning instruction to display unit 7 in step S5. When display unit 7 receives the warning instruction, it displays, e.g., "If processing is continued, an operation error may occur. Is processing to be continued?". The user determines whether the processing is to be continued or not, and transmits an instruction from remote control 14 or the like. Input unit 8 receives the instruction provided by the user.

When the user provides the instruction to stop the processing (YES in step S5), the processing changes to an error skip mode. In the error skip mode, the process proceeds to step S6. In step S6, controller 5 provides the error display instruction to display unit 7. Display unit 7 receives the error display instruction, and displays, e.g., "Program is not updated." When display unit 7 performs the display in step S6, the processing ends.

When the user provides in step S5 the instruction to continue the processing (NO in step S5), the process proceeds to step S7. In step S7, controller 5 determines whether matching occurs between the unchangeable conditions included in the respective kinds of H/W structure information, e.g., illustrated in FIG. 2.

When matching occurs between the unchangeable conditions in step S7, controller 5 determines whether matching occurs between the unchangeable conditions included in the respective kinds of H/W structure information. When mismatching occurs between the unchangeable conditions in step S7, the process proceeds to foregoing step S6, and display unit 7 performs the error display processing.

The processing in steps S8-S11 is performed for displaying and informing the user that the changeable condition includes a mismatching item(s), and input of the rewrite instruction is required for performing the rewrite processing.

In step S8, controller 5 determines whether certain items in the changeable conditions of the current and updated program match with each other or not. When the items in question do not match, controller 5 provides the request signal to display unit 7 in step S9.

In step S9, display unit 7 receives the request signal, and displays, e.g., "Progressive reproduction function does not match. Is processing to be continued? (Yes/No)". The user determines according to the display on the screen whether the processing is to be continued or not, and provides the instruction. The instruction provided from the user corresponds to the rewrite instruction.

In step S9, controller 5 receives the rewrite instruction from input unit 8. In step S9, when the rewrite instruction instructs the continuation of processing, or when matching occurs between the items of the changeable conditions in step S8, the process proceeds to step S10. In step S10, controller 5 obtains a next condition, i.e., an item which is included in the changeable condition, and has not yet undergone the determination about matching/mismatching between the current and updated programs. When the rewrite instruction indicates the stop of processing in step S9, the process proceeds to foregoing step S6, and display unit 7 performs the error display processing.

In step S11 subsequent to step S10, controller 5 determines whether a next condition is present or not. When the next condition is not present, the process proceeds to next step S4, and controller 5 performs the rewrite processing. When the next condition is present in step S11, controller 5 obtains the corresponding item, and determines matching/mismatching in step S8 again.

In steps S8-S1, processing is performed to display each of the conditions, which are included in the changeable condition and cause mismatching between the current and updated programs, and the user is requested to confirm for each of such conditions whether the processing is to be continued or not. Since the program, which was once replaced, cannot be restored, the above manner of confirmation is performed for increasing, as far as possible, the number of times that the user determines whether the program is to be updated or not. Accordingly, for reducing the load on user's operation, such a manner may be employed that the conditions, which are included in the changeable condition and cause mismatching, are displayed in a list form so that the user can select the rewrite processing in step S4 or the error display processing in step S6 by entering the instruction only one time.

According to the embodiment described above, even when mismatching occurs between the changeable conditions, the program is rewritten in response to the entry of the rewrite instruction from the user. Therefore, the program can be updated in a manner appropriately corresponding to the improvement in performance of the device, changes in operation environment and others.

Although the disc reproducing device has been described as an example of the device to which the information processing device of the invention is applied, the target of application is not restricted to the disc reproducing device, and the invention can be applied, e.g., even to a printer.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information processing device comprising:
   a rewritable storing unit, including a nonvolatile memory, nonvolatilely storing a control program for controlling an operation of the information processing device, and a first information representing an execution condition of said control program and including a first unchangeable condition not allowing change of an execution environment corresponding to said control program and a first changeable condition allowing change of said execution environment;
   a receiving unit reading an updated program and a second information from a record medium storing said updated program and said second information exhibiting an execution condition of said updated program and including a second unchangeable condition not allowing change of an execution environment corresponding to the updated program and a second changeable condition allowing change of said execution environment; and
   a rewriting unit comparing said first information with said second information, performing rewrite processing of replacing said control program with said updated program when a result of the comparison exhibits matching, and determining whether said rewrite processing is to be performed or not, according to a rewrite instruction received from a user when said result of the comparison exhibits mismatching, wherein
   said rewriting unit includes:
      a controller determining according to said result of the comparison whether input of said rewrite instruction is required for performing said rewrite processing or not, and providing a request for receiving said rewrite instruction when it is determined that the input of said rewrite instruction is necessary,
      a display unit displaying and informing the user that said rewrite processing requires the input of said rewrite instruction, in response to said request, and
      an input unit for inputting said rewrite instruction to be applied to said controller; and
   said controller provides said request when said result of the comparison exhibits that the first and second unchangeable conditions match with each other, and said first and second changeable conditions do not match with each other; and wherein
   the first changeable condition and the second changeable condition are related to quality of information to be processed by the device, respectively.

2. An information processing device comprising:
   a rewritable storing unit, including a nonvolatile memory, nonvolatilely storing a control program for controlling an operation of the information processing device, and a first information representing an execution condition of said control program;

a receiving unit receiving an updated program and a second information exhibiting an execution condition of the updated program; and a rewriting unit comparing said first information with said second information, performing rewrite processing of replacing said control program with the updated program when a result of the comparison exhibits matching, and determining whether said rewrite processing is to be performed or not, according to a rewrite instruction received from a user when said result of the comparison exhibits mismatching, wherein said rewriting unit includes a controller determining according to said result of the comparison whether input of said rewrite instruction is required for performing said rewrite processing or not, and providing a request for receiving said rewrite instruction when it is determined that the input of said rewrite instruction is necessary, said first information includes a first unchangeable condition not allowing change of an execution environment corresponding to said control program and a first changeable condition allowing change of said execution environment, said second information includes a second unchangeable condition not allowing change of an execution environment corresponding to said updated program and a second changeable condition allowing change of said execution environment, and said controller provides said request when the result of said comparison exhibits that said first and second unchangeable conditions match with each other, and said first and second changeable conditions do not match each other; and wherein the first changeable condition and the second changeable condition are related to quality of information to be processed by the device, respectively.

3. The information processing device according to claim 2, wherein said rewriting unit further includes:

a display unit displaying and informing the user that said rewrite processing requires the input of said rewrite instruction, in response to said request, and an input unit for inputting said rewrite instruction to be applied to said controller.

4. The information processing device according to claim 2, wherein said receiving unit reads said updated program and said second information from a record medium storing said updated program and said second information.

* * * * *